United States Patent
Calmel et al.

(10) Patent No.: US 9,190,928 B2
(45) Date of Patent: Nov. 17, 2015

(54) SWITCHED POWER SUPPLY

(75) Inventors: Pierre-Emmanuel Calmel, Versailles (FR); Mathias Moronvalle, Vauhallan (FR)

(73) Assignee: DEVIALET, Paris (FR)

( * ) Notice: Subject to any disclaimer, the term of this patent is extended or adjusted under 35 U.S.C. 154(b) by 0 days.

(21) Appl. No.: 13/634,910

(22) PCT Filed: Mar. 16, 2010

(86) PCT No.: PCT/FR2010/050471
§ 371 (c)(1),
(2), (4) Date: Nov. 30, 2012

(87) PCT Pub. No.: WO2011/114007
PCT Pub. Date: Sep. 22, 2011

(65) Prior Publication Data
US 2013/0069733 A1    Mar. 21, 2013

(51) Int. Cl.
*H02M 7/162*     (2006.01)
*H02M 7/219*     (2006.01)
(Continued)

(52) U.S. Cl.
CPC .............. *H02M 7/04* (2013.01); *H02M 7/043* (2013.01); *H02M 7/1626* (2013.01); *H02M 7/217* (2013.01); *H02M 7/219* (2013.01); *H02M 2001/0009* (2013.01); *H02M 2007/2195* (2013.01)

(58) Field of Classification Search
CPC ........... H02M 7/00; H02M 7/02; H02M 7/04; H02M 7/043; H02M 7/12; H02M 7/155; H02M 7/162; H02M 7/1623; H02M 7/1626; H02M 7/21; H02M 7/217; H02M 7/219; H02M 2007/2195

USPC .............. 323/272, 282–284; 331/185, 186; 363/15–20, 21.01–21.09, 21.12–21.17, 363/132
See application file for complete search history.

(56) References Cited

U.S. PATENT DOCUMENTS 3,863,140 A * 1/1975 Easter et al. .................. 323/288
4,621,312 A * 11/1986 Yuzurihara et al. ............. 363/17
(Continued)

FOREIGN PATENT DOCUMENTS

EP    2 157 684    2/2010
FR    2 693 321    1/1994

OTHER PUBLICATIONS

International Search Report for PCT/FR2010/050471 Dated Jan. 17, 2011.

*Primary Examiner* — Levi Gannon
(74) *Attorney, Agent, or Firm* — B. Aaron Schulman, Esq.; Stites & Harbison, PLLC.

(57) ABSTRACT

The switched power supply (10) comprises: an input (16) for an AC input current ($I_{PRI}$) under an input voltage ($V_{PRI}$); an output (36) for a DC output current ($I_{sec}$), and successively, from the input to the output, a system of controlled breaker switches (20); a transformer (21) whereof the primary (24) is linked at the output of the system of controlled breaker switches (20); a rectifying circuit (28) connected across the terminals of a secondary circuit (26) of the transformer; and a storage capacitor (32) linked in parallel across the output terminals of the rectifier circuit (28) with interposition of a coil (34), the output (36) being formed across the terminals of the storage capacitor (32). The system of controlled breaker switches (20) is the only circuit between the input (16) and the output (36) to comprise switching members and in that it comprises means (22) for controlling the system of breaker switches (20) so as to control the amplitude of the input current ($I_{PRI}$) as a function of the input voltage ($V_{PRI}$) of the output current ($I_{sec}$) and of the voltage ($V_{sec}$) across the terminals of the storage capacitor (32).

8 Claims, 3 Drawing Sheets

(51) Int. Cl.
*H02M 7/04* (2006.01)
*H02M 7/217* (2006.01)
*H02M 1/00* (2007.01)

(56) References Cited

U.S. PATENT DOCUMENTS

| | | | |
|---|---|---|---|
| 4,686,615 A * | 8/1987 | Ferguson | 363/17 |
| 5,963,436 A * | 10/1999 | Yoshida | 363/17 |
| 6,246,594 B1 * | 6/2001 | Matsuda et al. | 363/17 |
| 6,252,782 B1 * | 6/2001 | Akashi et al. | 363/17 |
| 6,483,723 B2 * | 11/2002 | Kuranuki et al. | 363/17 |
| 6,567,285 B2 * | 5/2003 | Cho et al. | 363/132 |
| 6,650,552 B2 * | 11/2003 | Takagi et al. | 363/17 |
| 7,158,392 B2 * | 1/2007 | Hosokawa et al. | 363/21.06 |
| 8,107,262 B2 * | 1/2012 | Won et al. | 363/21.02 |
| 8,400,799 B2 * | 3/2013 | Fujiyoshi et al. | 363/98 |
| 2008/0101096 A1 * | 5/2008 | Takayanagi et al. | 363/17 |

* cited by examiner

SWITCHED POWER SUPPLY

The present invention relates to a switched power supply, comprising:
- an input for an AC input current under an input voltage;
- an output for a DC output current, and
- successively, from the input to the output,
  - a system of controlled breaker switches;
  - a transformer whereof the primary is linked at the output of the system of controlled breaker switches;
  - a rectifying circuit connected across the terminals of a secondary circuit of the transformer; and
  - a storage capacitor linked in parallel across the output terminals of the rectifier circuit with interposition of a coil, the output being formed across the terminals of the storage capacitor.

Many electronic devices are powered from the grid distributing a sinusoidal signal through a switched power supply able to provide a direct power supply current.

This is for example the case for high-fidelity amplifiers.

The traditional structure of such a switched power supply generally comprises, as input, a boost-type circuit able to convert the sinusoidal current into direct current under a voltage greater than the voltage of the sinusoidal power supply current. It is followed by a direct current-direct current converter implementing a controlled breaker switch bridge followed by a rectifier formed from a diode bridge. The controlled breaker switch bridge and the diode bridge are linked to each other by a transformer.

The boost circuit traditionally includes a coil powering a capacitor through a diode, the association of the diode and capacitor being mounted in parallel with a controlled breaker switch. This breaker switch is opened according to a cyclic ratio able to allow the capacitor to be charged by a voltage higher than the input voltage.

Such a switched power supply therefore includes two switching stages, a first in the boost circuit and the second in the controlled breaker switch bridge. This double switching structure is the source of a relatively low output from the switched power supply.

The invention aims to propose a switched power supply having a high output.

To that end, the invention relates to a switched power supply of the aforementioned type, characterized in that the system of controlled breaker switches is the only circuit between the input and the output to comprise switching members and in that it comprises means for controlling the system of breaker switches so as to control the amplitude of the input current as a function of the input voltage of the output current and of the voltage across the terminals of the storage capacitor.

According to specific embodiments, the power supply comprises one or more of the following features:
- the power supply comprises means for measuring the output current;
- the power supply comprises means for estimating the output current only during a phase not supplying energy to the storage capacitor from the input;
- the means for estimating the output current comprise means for measuring the voltage drop $\Delta U$ across the terminals of the storage capacitor during the phase not supplying energy to the capacitor and means for calculating the output current from the variation speed of the voltage determined from the voltage drop at the terminals of the capacitor;
- the power supply comprises means for calculating the power consumed at the output, means for calculating a reference amplitude of the input current as a function of the power consumed at the output, and control means for the system of breaker switches comprising means for regulating the input current as a function of the reference amplitude of the input current;
- the means for calculating the consumed power are able to calculate a consumed power for each half-period of the input current;
- the means for calculating the power can calculate said power from the weighted sum of the power supplied to the storage capacitor and the power transmitted as output to the charge; and
- the system of breaker switches forms a bridge.

The invention also relates to a high-fidelity amplifier comprising an amplification stage and a switched power supply as defined above.

The invention will be better understood upon reading the following description, provided solely as an example and done in reference to the drawings, in which.

Figure 1:
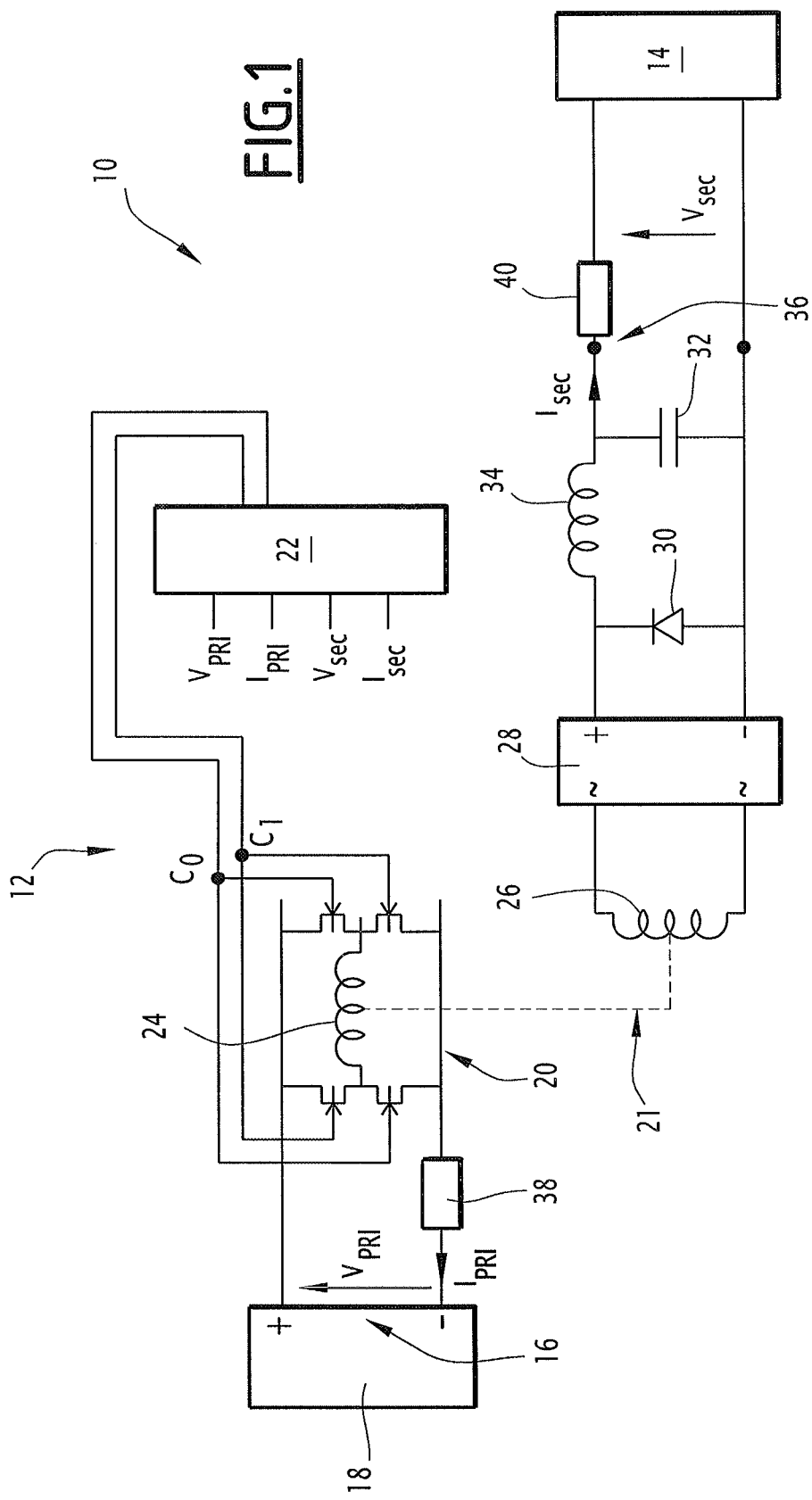
FIG. 1 is a diagrammatic circuit of the switched power supply according to the invention integrated into an amplifier.

FIG. 1 illustrates a high-fidelity amplifier 10 comprising a switched power supply 12 powering an amplification stage 14. The amplification stage 14 of any adapted type is for example described in patent application FR 2,873,872.

The switched power supply 12 has an input 16 that can be linked to a power supply grid 18 supplying a sinusoidal current, for example 220 V at a frequency of 50 or 60 Hz.

The input voltage is denoted $V_{PRI}$ and the intensity passing through the input 16 is denoted $I_{PRI}$. The input 16 is directly linked, without interposition of a boost circuit at the input of a breaker switch bridge 20 whereof the output is connected to a transformer 21.

As is known in itself, the breaker switch bridge 20 comprises two parallel branches each comprising two controllable breaker switches mounted in series, said two branches being connected between the two input terminals 16. The connection points of the breaker switches of a same branch make up the output of the breaker switch bridge.

Each of the breaker switches is for example made up of a MOS-type transistor, and those transistors are controlled by a control circuit 22.

The transformer 21 comprises a primary circuit 24 connected between the two serially mounted controlled breaker switches of each branch and a secondary circuit 26 connected across the input terminals of a rectifying circuit 28, for example formed from a diode bridge known in itself.

A diode 30 is connected between the two output terminals of the diode bridge 28.

The output of the diode bridge 28 is also linked to a storage capacitor 32 through a coil 34. Said coil is arranged between the cathode of the diode 30 and one of the terminals of the capacitor 32. The output denoted 36 of the switched power supply is formed at the terminals of the capacitor 32. The output current is denoted $I_{sec}$, while the output voltage is denoted $V_{sec}$.

Means for measuring the input intensity $I_{PRI}$ and the output intensity $I_{sec}$ are provided at the input and output of the switched power supply. They are for example formed from a resistance 38 and 40, respectively, across the terminals of which the voltage is measured, that voltage being proportional to the intensity circulating in the resistance.

The bases of the opposing controlled circuit breakers of the two branches of the bridge 20 are linked together to receive a same command denoted $C_O$ and $C_1$, respectively.

The control circuit 22 receives the input voltage $V_{PRI}$, the input intensity $I_{PRI}$, the output voltage $V_{sec}$ and the output intensity $I_{sec}$ as input, through any adapted means.

Figure 2:
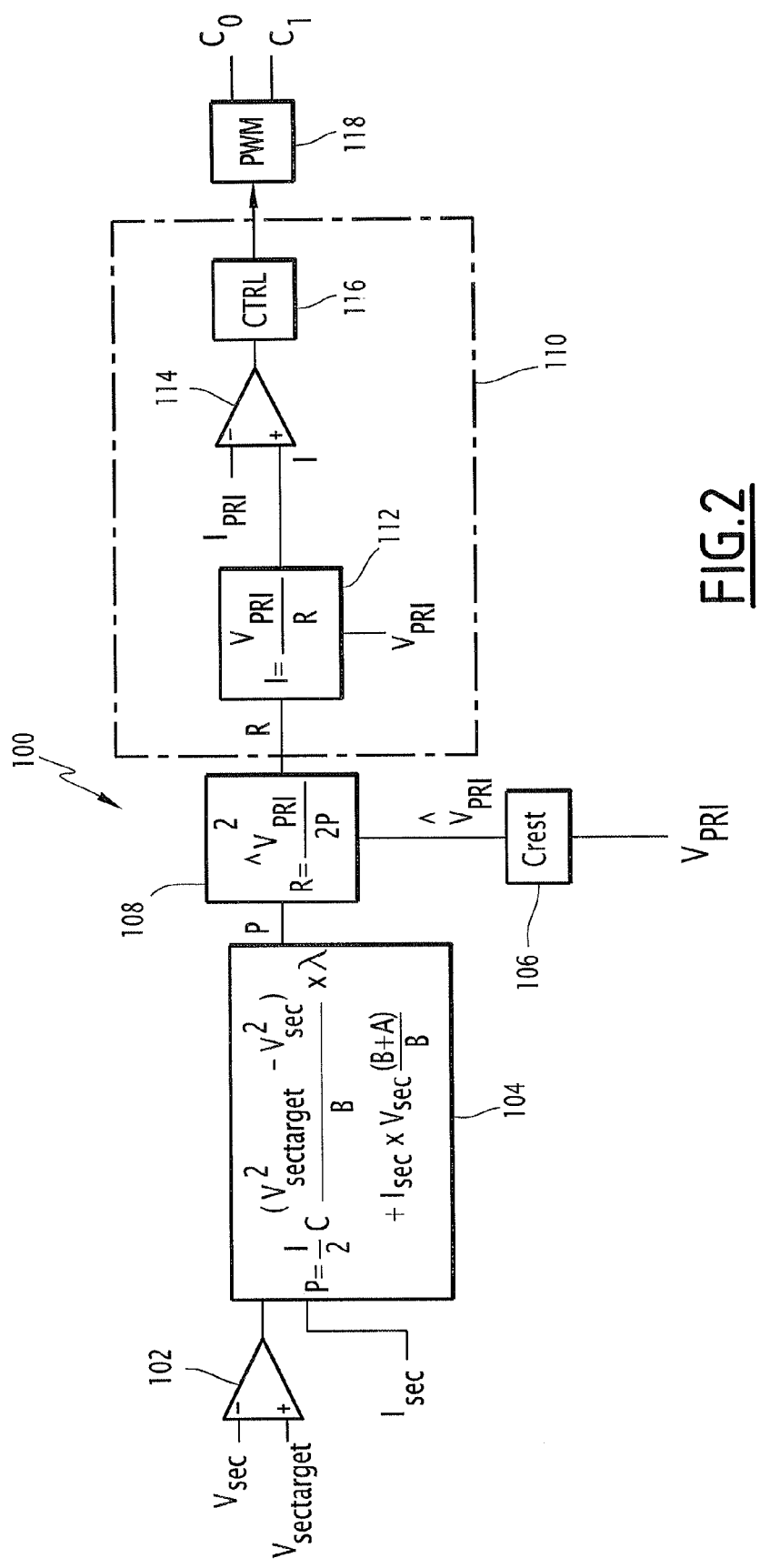
FIG. 2 is a summary diagram of the control mode for the breaker switches implemented in the power supply shown in FIG. 1.

FIG. 2 illustrates the regulating chain 100 implemented by the control circuit 22. The switched power supply is designed to supply a constant reference voltage denoted $V_{sectarget}$. This is for example equal to 50 V. This voltage is the voltage measured across the terminals of the storage capacitor 32.

The control circuit 22 can supply the two control signals $C_0$ and $C_1$ respectively applied to the diametrically opposite controlled breaker switches of the bridge 20.

The regulator 100 illustrated in FIG. 2 comprises as input a comparator 102 receiving the reference voltage Vsectarget and the measured output voltage $V_{sec}$. The regulator also receives the output intensity $I_{sec}$. According to a first embodiment, this is measured continuously using the resistance 40.

Figure 3:
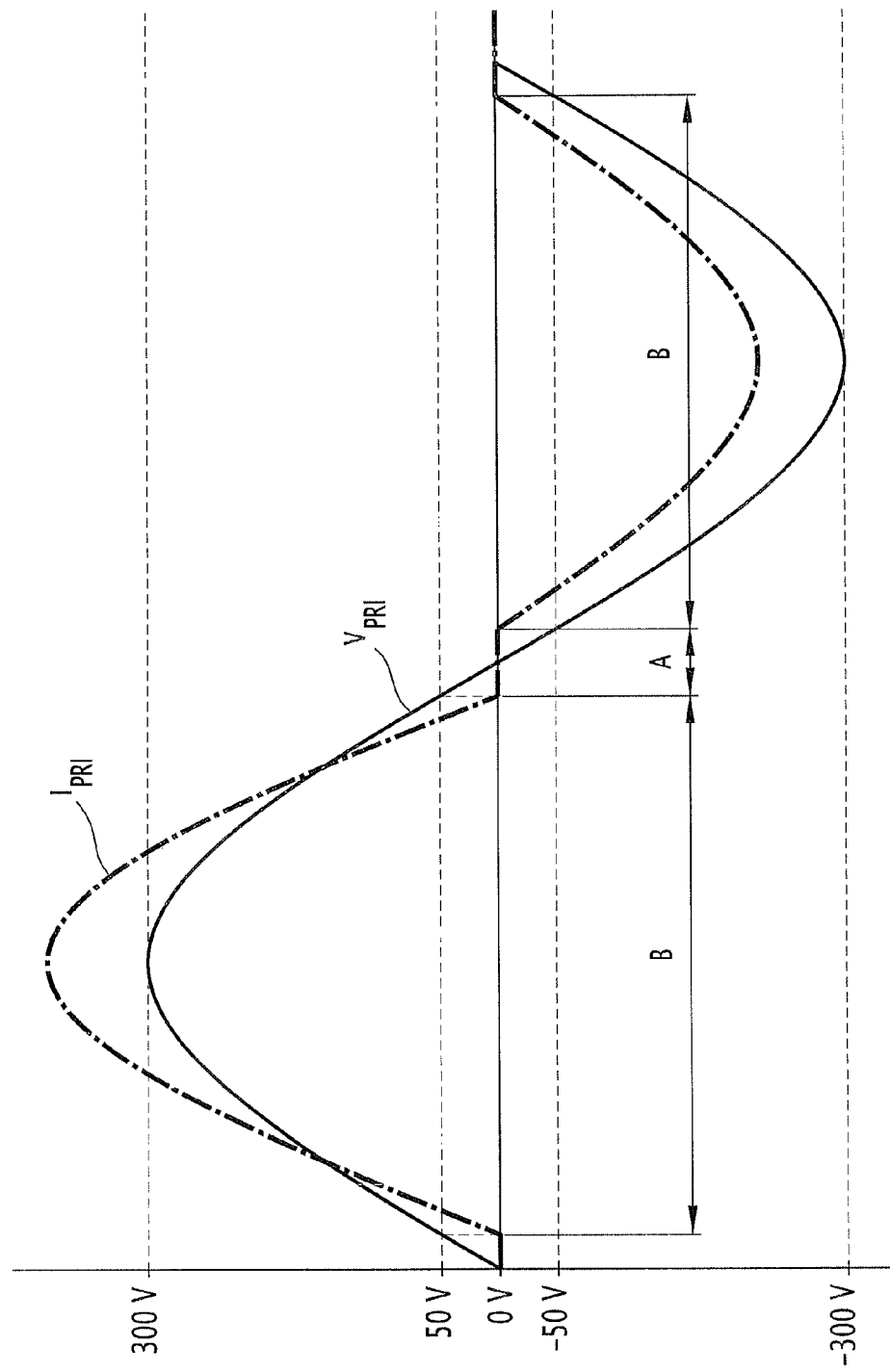
FIG. 3 is a curve illustrating the voltage and the input current of the switched power supply.

A stage 104 calculates the average power P that will be consumed by the power supply during the following sector half-period. This power is made up of the sum of two terms: the first represents the power to be supplied to the capacitor 32 to go from the current voltage Vsec to the reference voltage Vsectarget, while the second represents the estimate of the power to be supplied to the charge 14.

$$P = \frac{1}{2}C\frac{(V_{sectarget}^2 - V_{sec}^2)}{B} \times \lambda + I_{sec}V_{sec}\frac{(B+A)}{B}$$

where $\lambda$ is a weight coefficient preferably smaller than 1,
C is the capacity of the capacitor 32, and
A and B are the durations of the periods not supplying and supplying energy, respectively, to the storage capacitor 32 over a half-period of the power supply signal. The durations A and B are illustrated in FIG. 3.

Thus, the power P is calculated once for each half-period of the power supply signal, or every 10 milliseconds for a 50 Hz signal.

A stage 106 for calculating the peak voltage $\hat{V}_{PRI}$ receives the input voltage $V_{PRI}$ as input.

A stage 108 for calculating the equivalent resistance is linked at the output of the stages 104 and 106 and can calculate the equivalent resistance R from the quotient of the square of the peak voltage $\hat{V}_{PRI}$ divided by twice the power P calculated in 104.

The equivalent resistance R is introduced into a secondary regulating loop 110 comprising as input a stage 112 for calculating the intensity I that must be consumed at the input 18 to compensate for the discharge of the capacitor 32 and the power supply of the charge 14. This intensity I is given by the quotient of the input voltage $V_{PRI}$ by the resistance previously determined R.

The intensity I is sent to a comparator 114 receiving, on one input, the input intensity $I_{PRI}$, and on the other input, the calculated intensity I. The output of the comparator 114 is connected to a control stage 116, which drives, from the intensity difference $I-I_{PRI}$, a pulse width modulation regulator 118 defining and applying the references $C_0$ and $C_1$, as is known in itself.

Due to the presence of the capacitor 32, which is normally charged with a voltage equal or close to the reference voltage $V_{sectarget}$ and taken as equal to 50 volts in the example under consideration, the grid can only supply energy when the absolute value of the voltage supplied by the grid is greater than 50 volts. When the voltage of the grid is between −50 and +50 V, no current is taken from the grid.

The solid line in FIG. 3 shows the power supply voltage $V_{PRI}$ and the broken line shows the intensity of the current $I_{PRF}$ circulating through the input 16. This figure shows that the intensity is zero when the supply voltage $V_{PRI}$ is between −50 volts and +50 volts.

Thus, for each period of the power supply signal, two non-conducting phases of duration A exist, these phases corresponding to the time during which the input voltage is between 50 and −50 volts. These two non-conducting phases are separated by conducting phases of duration B, during which the breaker switches of the bridge 20 are controlled by the unit 118 as a function of a predetermined cyclic ratio.

The regulating chain 100 is such that this cyclic ratio is calculated during each non-conducting phase of duration A and applied during the subsequent conducting phase of duration B so as to compensate accurately, during that conducting phase, the power variation of the storage capacitor and the power transmitted in output to the charge.

During a non-conducting phase A, the current I to be supplied during the subsequent conducting phase B is calculated by the stages 102 to 112 using the formula $$I = \frac{V_{PRI}}{\hat{V}_{PRI}^2 B}(\lambda C((V_{sectarget}^2 - V_{sec}^2) + 2I_{sec}V_{sec}(B+A)),$$

then the cyclic ratio is determined by the stage 116 from the power supply intensity $I_{PRI}$ so as to drive the breaker switches of the bridge 20 using the driver stage 118 during the subsequent conducting phase B.

According to a second embodiment, the resistance 40 is eliminated and the current $I_{sec}$ is assumed to be constant over each period of the power supply current and is estimated only during each non-conducting phase of duration A.

To that end, during each non-conducting phase, a voltage drop $\Delta U$ at the terminals of the storage capacitor 32 is measured and the output current $I_{sec}$ is determined using the $$\text{formula } I_{sec} = C\frac{\Delta U}{\Delta t}$$

where C is the capacity of the capacitor 32, and
$\Delta t$ is the observation period of the voltage drop.
The other control steps are identical.

One can see that with such a switched power supply structure, the output is high owing to the use of a single switching stage. Furthermore, this output is even higher inasmuch as the only energy consumed by the charge is actually taken from the power supply grid owing to the driving law of the breaker switch bridge implemented.

Furthermore, such a switched power supply has, seen from the grid, a characteristic close to the characteristic of a resistance since, throughout the entire period B, the current consumed on the charge 18 is proportional to the voltage present on the charge 18; the current therefore follows Ohm's law Ipri=Vpri/R.

The invention claimed is:
1. A switched power supply, comprising:
an input for an AC input current under an input voltage;
an output for a DC output current, and
successively, from the input to the output,
  a system of controlled breaker switches;

a transformer whereof the primary is linked at the output of the system of controlled breaker switches;

a rectifying circuit connected across the terminals of a secondary circuit of the transformer; and a storage capacitor linked in parallel across the output terminals of the rectifier circuit with interposition of a coil, the output being formed across the terminals of the storage capacitor, wherein the system of controlled breaker switches is the only circuit between the input and the output to comprise switching members and is also configured so as to control the amplitude of the input current as a function of the input voltage of the output current and of the voltage across the terminals of the storage capacitor; and wherein the system of controlled breaker switches if fed with an AC current and forms a bridge that is linked to the input for an AC input under the input voltage.

2. The power supply according to claim 1, characterized in that it comprises means for measuring the output current.

3. The power supply according to claim 1, characterized in that it comprises means for estimating the output current only during a phase not supplying energy to the storage capacitor from the input.

4. The power supply according to claim 3, characterized in that the means for estimating the output current comprise means for measuring the voltage drop ΔU across the terminals of the storage capacito during the phase not supplying energy to the capacitor and means for calculating the output current from the variation speed of the voltage determined from the voltage drop at the terminals of the capacitor.

5. The power supply according to claim 1, characterized in that it comprises means for calculating the power consumed at the output, means for calculating a reference amplitude of the input current ($I_{PRI}$) as a function of the power consumed at the output, and control means for the system of breaker switches comprising means for regulating the input current as a function of the reference amplitude of the input current.

6. The power supply according to claim 5, characterized in that the means for calculating the consumed power are able to calculate a consumed power for each half-period of the input current.

7. The power supply according to claim 5, characterized in that the means for calculating the power can calculate said power from the weighted sum of the power supplied to the storage capacitor and the power transmitted in output to the charge.

8. An amplifier comprising an amplification stage and a switched power supply according to claim 1.

* * * * *